R. H. ROSENBERG.
WHEEL BRAKE.
APPLICATION FILED FEB. 14, 1912.
1,124,332.
Patented Jan. 12, 1915.
2 SHEETS—SHEET 1.
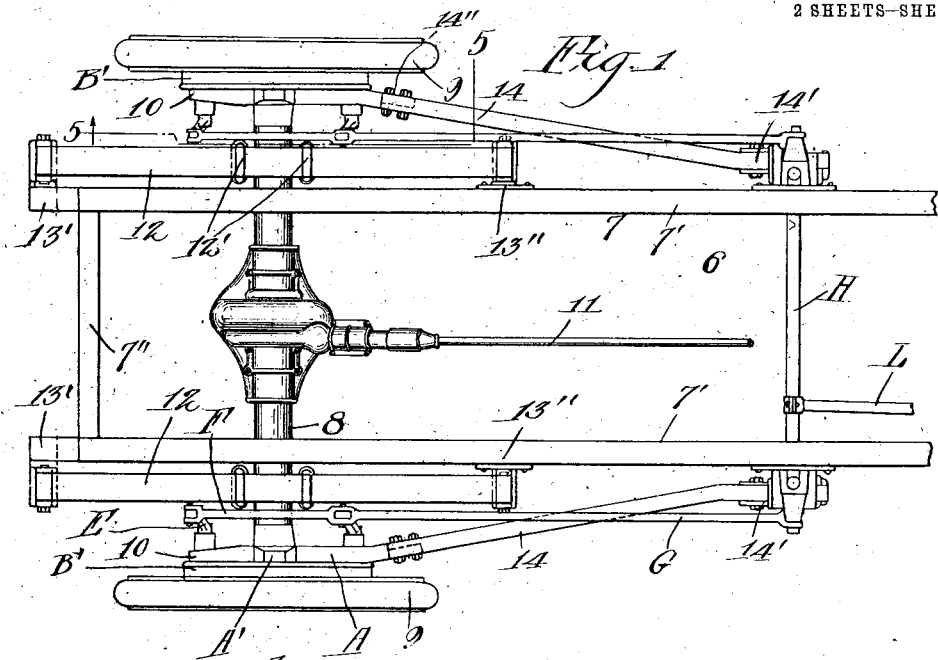
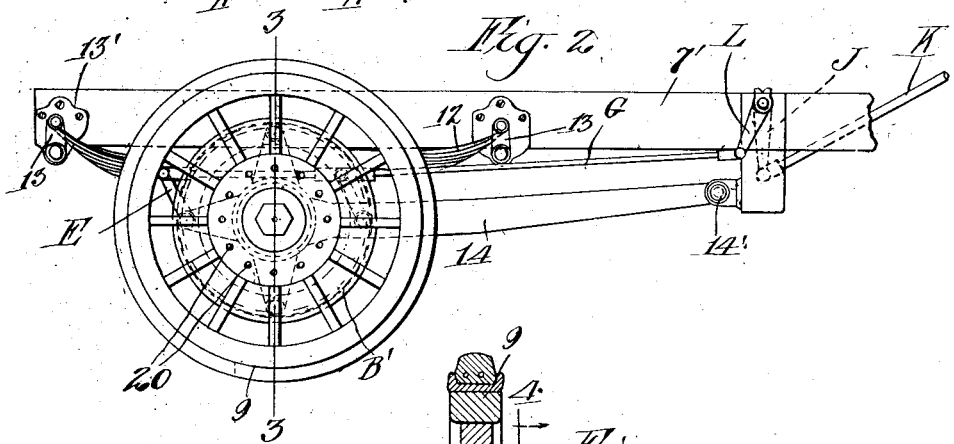
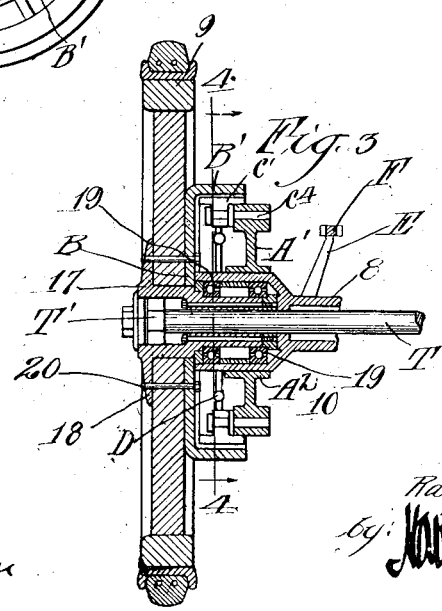
Witnesses:
Robert S. McCreadie
Edward F. Wilson
Inventor:
Ralph H. Rosenberg

R. H. ROSENBERG.
WHEEL BRAKE.
APPLICATION FILED FEB. 14, 1912.

1,124,332.

Patented Jan. 12, 1915.
2 SHEETS—SHEET 2.

Witnesses:
Robert D. McCreadu
Edward J. Wilson

Inventor:
Ralph H. Rosenberg,
by Hawley & Spellman
Attys.

UNITED STATES PATENT OFFICE.

RALPH H. ROSENBERG, OF COLUMBUS, OHIO, ASSIGNOR TO THE KINNEAR MANUFACTURING COMPANY, OF COLUMBUS, OHIO, A CORPORATION OF WEST VIRGINIA.

WHEEL-BRAKE.

1,124,332.

Specification of Letters Patent.

Patented Jan. 12, 1915.

Application filed February 14, 1912. Serial No. 677,558.

*To all whom it may concern:*

Be it known that I, RALPH H. ROSENBERG, a citizen of the United States, and a resident of Columbus, county of Franklin, and State of Ohio, have invented certain new and useful Improvements in Wheel-Brakes, of which the following is a specification.

My invention relates to improvements in vehicles and has particular reference to improvements in brake mechanism for heavy vehicles, as trucks and drays.

The object of my invention is to provide a brake mechanism for use upon trucks, which shall be strong and durable; which shall be powerful in operation; which shall be capable of being thrown into and out of operation, and which shall have frictional contacting and wearing surfaces of large area relative to the dimensions of the brake drum.

A further object of my invention is to provide a brake mechanism which shall have a brake member composed of a plurality of rigid sections associated with a brake rim and which shall afford substantially complete circumferential frictional contact of said sections with the rim when the brake is in operation or set.

My invention consists in the improved combination of elements or parts and the features of construction whereby the above and other objects are attained and all as hereinafter described and particularly pointed out in the appended claims.

Figure 4:
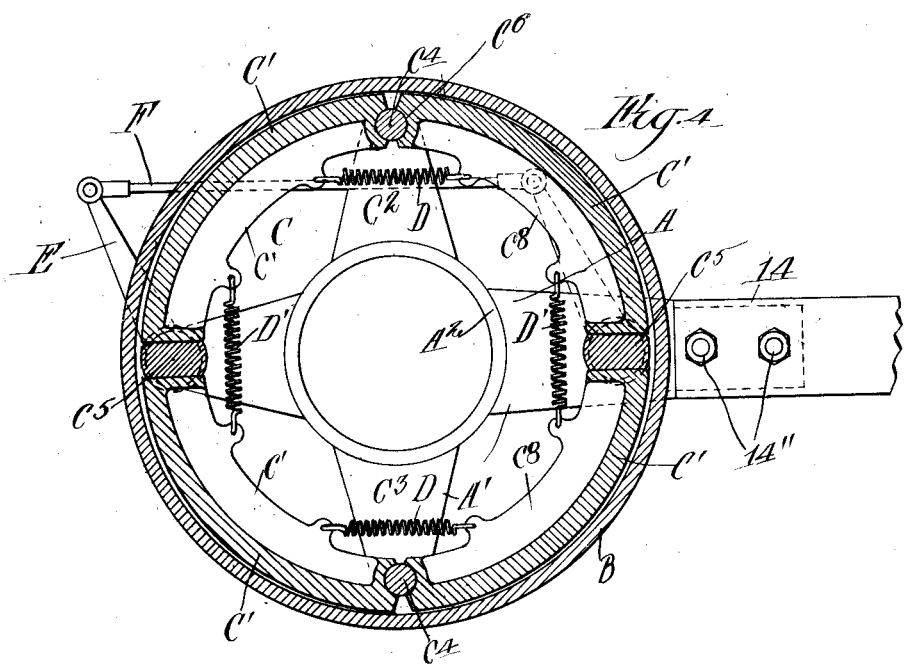
Figure 5:
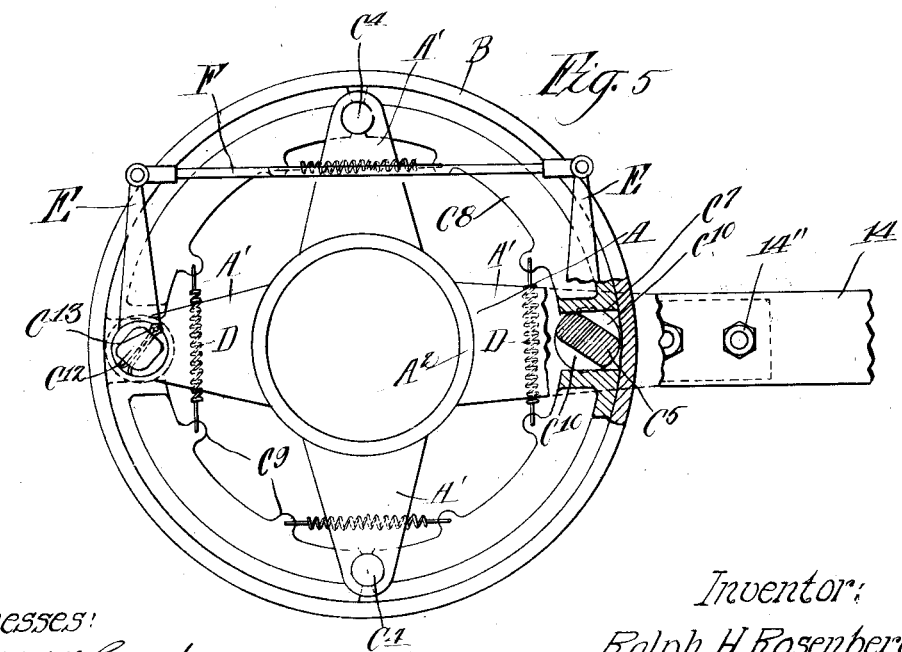

My invention will be more fully understood by reference to the accompanying drawings forming a part of this specification; and in which:

Figure 1 is a plan view of one end of the chassis of an automobile having wheels equipped with brake mechanisms which embody my invention; Fig. 2 is a side elevation of the chassis shown in Fig. 1; Fig. 3 is an enlarged vertical central section on the line 3—3 of Fig. 2 through one of the wheels and associated brake mechanism; Fig. 4 is an enlarged vertical transverse section of the brake mechanism taken on the line 4—4 of Fig. 3 facing in the direction of the arrow and showing the brake parts in their normal inoperative position; and Fig. 5 is an enlarged side elevation of the brake mechanism looking from the inner side thereof and taken on the line 5—5 of Fig. 1 and showing the brake set.

Although the illustration of my invention, as shown in the drawings, is confined to automobiles, it is to be understood that the application and use of my invention is not limited thereto, but may be advantageously extended to include various motor and non-motor vehicles.

As it is customary to associate the brakes of a vehicle with the rear wheels, I have so shown them in the drawings, but the application of my improved brake is not limited to such use.

The frame 7 of the motor vehicle is supported upon the axle 8 and wheels 9 and the wheels are equipped with my improved brake mechanism 10. The frame 7 includes the two longitudinal side bars 7' and the rear cross bar 7". This frame is supported by means of a pair of laterally positioned, bow-shaped leaf springs 12 which I pivot at their ends by means of swinging links 13 to the sides of the frame at the points 13' and 13" at the rear and front of the axle respectively. These springs extend downwardly and at their center rest upon the axle 8 to which I securely fasten them by U-bolts 12'.

The wheels 9 are mounted on the outer ends of the axle 8 at each side of the frame. These, the rear wheels, as is customary in motor-car practice, are used as driving wheels. Power is transmitted from the engine or motor in front, and not shown, to the rear axle and wheels by means of suitable mechanism including the driving shaft 11 and torsion axle T, a description of which for the purpose of this specification is not necessary as the driving mechanism does not form part of this invention.

My improved brake is of the general class known as internal brakes and comprises two correlative fundamental parts which I arrange to oppose each other, one of which, consisting of an annular rim B', I attach to or form substantially integral with the inner side of the wheel and concentric with the axis thereof and the other of which consisting of a substantially stationary mechanism 10, I mount non-rotatively on the axle adjacent to the inner side of the wheel for braking contact with the first said part or rim B' on its inner surface.

For the purpose of mounting the said non-rotatable portion of the brake in coactive relation with the rotary part and holding it securely in operative position adjacent to the said wheel, I provide a radial frame or spider A which I pivot at its center on the axle at or near the outer end thereof. This spider A comprises a central hub portion $A^2$ and a plurality of radial arms A' having shoe-supporting means on their outer ends, as hereinafter described, four arms being used in the embodiment herein illustrated. In order to secure the highest degree of simplicity and effectiveness of certain operating mechanism, as hereinafter described, and by which I arrange to control the brakes, I prefer to form the spider with two of its arms extending horizontally in opposite directions toward the front and rear respectively and two others extending vertically, one upwardly and the other downwardly. The forwardly extending arm I extend slightly longer than the others and form the end to be connected rigidly by means of bolts 14'' with the rear end of a radius rod 14 which I provide for holding the axle steady in right angular transverse position, and which extends forwardly to an intermediate point on the side of the frame where I pivotally secure it to a lug 14' mounted on the outer side of the side bar 7'.

The spider A, being pivotally mounted on the axle, is free to oscillate slightly sufficient to accommodate vertical movement of the axle with respect to the frame, and the accompanying flexure of the springs 12, such as is ordinarily occasioned by the passage of the vehicle over an uneven roadway. The necessary resultant angular motion of the radius rod with respect to the frame, due to flexure of the springs, and the relative vertical motion of the axle 8 and frame is accommodated by the pivotal joining of the forward end of the rod with the side bar 7'. The radius rods not only serve to maintain the substantially right angular transverse relation of the axle with respect to the frame, but hold the brake spider against turning.

The brake wheels may be of any suitable construction and may be mounted in any suitable manner convenient for equipping with the brake mechanism herein described. In the embodiment of my invention herein shown each brake wheel 9 is provided on its inner side with a radial spoke clamping flange B, the outer portion of which I extend radially slightly beyond the ends of the spider arms and turn transversely away from the wheel thereby forming a circular flange or brake rim B', preferably of cylindrical shape and extending slightly inwardly adjacent to the outer ends of the arms of the spider and toward the frame 7. Each wheel has a hollow metal hub 17 formed and adapted for mounting upon the axle. The hub has an integral cylindrical projection which extends axially within the fixed hollow axle 8, and is rotatively mounted therein on antifriction bearings 19. A floating torsion axle or driving shaft T is shown positioned within the rigid axle 8 and with its outer end or head T' rotatively connected with the outer end of the hollow hub 17. The hub has an outer radial flange 18 integral therewith between which and the said flange B the spokes are securely clamped by bolts 20 which extend through the two flanges and the inner ends of the spokes. Thus the brake rim B' is rigidly formed on the wheel concentric with the axle 8, and being substantially integral with the wheel as a whole provides a most strong and secure means for applying a braking force thereto. The inner surface of the rim is cylindrical and smooth and is adapted to be engaged frictionally by the outer surfaces of certain non-rotatable brake members or shoes hereinafter more fully described and which are mounted in annular arrangement on the spider A within said rim and constitute a stationary sectional brake ring.

The substantially fixed or non-rotatable inner portion C of the brake comprises a generally ring-shaped structure consisting of a plurality of rigid brake shoe segments C' arranged end to end and operatively mounted on the outer ends of the arms A' of the spider A. In the form herein illustrated the friction ring C comprises two substantially independent operating parts arranged oppositely from each other and constituting an upper half $C^2$ and the other a similarly arranged lower half $C^3$, each of which consists of a pair of the said friction ring segments or shoes C' pivoted upon a common transverse cylindrical pin $C^4$, one of which is mounted on the outer end of each of the vertically extending arms of the spider. Both of these pins or pivots $C^4$ extend transversely from the spider toward the wheel.

The opposite or outer ends of the said upper and lower halves of the brake ring lie adjacent to the outer ends of the longitudinally extending arms A' on which I mount powerful operating means arranged to react between the upper and lower ring members to expand the ring and set the brakes. For this purpose, I provide rotatable pins $C^5$ peculiarly formed to provide for operative controlling contact with the adjacent ends of the ring segments and connecting with control means extending within reach of the operator as hereinafter more fully set forth.

Each segment C' of the non-rotatable portion of the brake consists of a substantially rigid segmental member having a curved outer surface adapted to fit against and frictionally engage the inner surface of the brake rim B' when forced outwardly into contact therewith. The pivot engaging end of each segment C' is provided with a transverse groove C⁶ adapted to fit closely upon one of the pivots C⁴, the adjacent pivot ends of each pair of segments being so formed that when the two segments forming a pair are assembled and held together with their grooved ends fitting on a common pivot, they form substantially a continuous semi-circular arc or half ring flexibly pivoted at the middle of the said arc. Each segment C' is provided on its inner side with a central inwardly projecting radial flange or web C⁸ to stiffen the same. The inner edge of the web portion C⁸ is provided with perforated lugs C⁹, one at each end, for attaching the ends of coiled tension springs D and D' hereinafter described.

The springs D are connected to the adjacent pivoted ends of segments C' on opposite sides of each fixed pivot C⁴ and serve to hold the segments in close operative engagement with the said pivots. The non-pivoted or swinging end of each segment is formed with a plain radial bearing surface C⁷ so arranged that when the opposite pairs are assembled on the spider, the adjacent non-pivoted ends present opposing surfaces which are substantially parallel to each other. The said ends are held slightly spaced apart more or less by an operating pin or cam C⁵ arranged between them. The adjacent non-pivoted ends of the upper and lower halves are drawn toward each other and into bearing contact with the said operating pins C⁵ by the coiled springs D' formed and mounted in a manner similar to springs D, as above explained.

For the purpose of forcibly spreading the brake segments C' and so expanding the brake ring to set the brake, I form the segment engaging portion of the operating pins C⁵ with a cam surface. Each of these cam pins is of a generally cylindrical shape and is formed on the inner end as a cylindrical shaft portion fitting rotatively in a transverse bearing in the outer end of the spider arm. The outer end extends toward the wheel and between the adjacent ends of the upper and lower semi-circular pairs of ring segments C'. This outer portion of the pin is provided with oppositely positioned transverse horizontal slots or grooves C¹⁰ adapted to receive the adjacent non-pivoted opposing ends of the brake segments, the end faces C⁷ of which normally press against the bottom of the slots. The slots C¹⁰ impart to the pin the character of a double cam symmetrically formed with long and short diameters at right angles to each other whereby when the pin is rotated the adjacent segment ends are forced apart and the brake ring expanded.

The inner end of the cam pin is formed with a square end or head C¹² to receive a crank arm E adapted to fit thereon and to rotate the cam pin sufficiently to operate the brake. To hold the cam on the head C¹² to prevent the cam pin from slipping from its bearing in the cam C', I provide a cotter pin C¹³ in the end of the head C¹².

Two arms E are provided for each brake, one arm for the front cam pin C⁵ and the other for the rear cam pin C⁵. The arms E extend upwardly and are connected at their free upper ends by a connecting rod F. The forward end of the connecting rod is connected to a brake rod G which extends forward and connects by appropriate mechanism with operating means convenient for control by the operator.

The forwardly extending mechanism for operating the brake comprises a rock-shaft H rotatively mounted transversely of the frame 6 on the side bars 7'.

Between the side bars 7' there is rigidly attached to the said rock-shaft H a downwardly extending crank arm J to the lower end of which is pivotally connected a brake rod K which extends forwardly and upwardly to the operator's control lever, not shown.

There is rigidly connected to each end of the rock-shaft H outside the frame 7 a downwardly extending crank arm L to the lower end of which is pivotally connected the front end of the brake rod G. That part of the brake equipment which lies to the rear of the rock-shaft H is duplicated on opposite sides of the frame.

In the normal or non-operative position of the brake, with the segments C' withdrawn from contact with the rim B', the cam-controlling crank arms E are inclined rearwardly to the full extent of their movement. When the brake is operated to stop the vehicle the lever arms E are drawn forward past the vertical position to a more or less forwardly inclined position. This arrangement provides for the most efficient and reliable action of the brake. The annular series of separate brake segments each operates substantially independently of its neighbors and provides numerous well-defined bearing surfaces, all coöperating effectively throughout substantially a complete ring area to brake the wheel.

The pivoted ends of the segments C' are held in very close relation to the inner surface of the ring B' at all times and in such a position that only slight radial movement is necessary to set them against the brake rim. When the brake is operated each segment rotates upon its fixed pivot as the cams operate to spread the segments apart. The outer surfaces of the segments conform accurately with the inner surface of the brake rim and when the segments are spread by the cams they are brought into substantially complete superficial contact with the brake rim throughout substantially their entire opposed contacting surfaces.

The cam $C^5$ is so proportioned and the operating cranks and rods so adjusted that it is only necessary for the cam to turn through an angle of about 90 degrees in setting the brake. By this arrangement the cam is so positioned when the brake is set with the long diameter of the cam at an angle between the opposing end faces of the adjacent segments, that as soon as the brake control mechanism is released by the operator the springs $D'$ will operate automatically to restore the brake to its normal position.

When the free ends of the segments $C'$ are in their normal position resting against the bottoms of the slots $C^{10}$ they are held against lateral movement by the walls of the slots. These slots are of such depth that when the cam is turned to the necessary extent for setting the brakes the segments are not thrown entirely out of the slots, but are still guided thereby.

In setting my improved brake, the mechanism operates as follows: When the operator throws the brake-controlling hand lever, not shown, the shaft H is oscillated and the brake rod G is drawn forward. This action oscillating the cam controlling arms E forwardly, thus operating the cams $C^5$ by turning them to force the coacting ends of the brake shoes apart and expanding the brake ring C, in opposition to the restoring springs $D'$, to set the brake. When the operator releases the brake handle the restoring springs automatically disengage the brake by contracting the brake ring and simultaneously returning all parts of the brake mechanism to their normal inactive position.

As many structures which embrace my invention will readily suggest themselves to persons skilled in the art, I do not limit my invention to the specific structure herein shown and described.

Having thus described my invention, I claim as new and desire to secure by Letters Patent:

1. A vehicle wheel, in combination with a cylindrical brake rim carried thereby and concentric therewith, and a non-rotatably mounted segmental brake ring consisting of a plurality of pairs of independently movable but rigid brake segments arranged end-to-end within said rim and substantially filling the peripheral space within said rim, means interposed between the adjacent ends of the pairs for forcing said segments outwardly against the said rim and pivots interposed between the adjacent ends of the two segments of each pair for supporting said segments adjacent to the inner surface of the ring.

2. In a wheel brake, a cylindrical rim concentric with the wheel and rigidly attached to one side thereof, a non-rotatable frame or spider coaxially mounted adjacent to the rim, an expansible brake shoe ring comprising a plurality of pairs of independently movable but rigid segments pivoted at their inner ends to the outer ends of alternate arms of said spider, said segments having outer friction surfaces curved to fit the inner surface of said rim, and cam means on the outer end of the remaining alternate spider arms adapted to oppositely coact with and between the adjacent outer ends of said segments to force them apart for setting the brake, and means for simultaneously operating said cam means.

3. A wheel brake comprising a cylindrical contact rim fixed to the wheel concentrically therewith, in combination with a plurality of substantially rigid brake ring segments positioned substantially within and adjacent to the rim, said segments being grouped in pairs arranged end to end and the several segments of each pair respectively being pivoted at their adjacent ends and the opposite ends being radially oscillatory about the respective pivots for frictional engagement with said cylindrical member, and means controllable by the operator for simultaneously operating each of said segments to force the free ends thereof outwardly against the rim.

4. A vehicle wheel provided with a cylindrical brake rim concentric with the wheel, combined with a non-rotatably mounted segmental brake ring consisting of a plurality of pairs of brake segments arranged end-to-end within said rim and substantially filling the peripheral space within said rim, means for pivotally supporting the non-operated ends of each pair of brake segments, and means interposed between the adjacent ends of the pairs of segments for forcing said segments outward against the said rim and means for simultaneously operating said last named means.

In testimony whereof, I have hereunto set my hand, this 26 day of January, 1912, in the presence of two subscribing witnesses.

RALPH H. ROSENBERG.

Witnesses:
 ROBERT H. COCHRAN,
 EDWARD H. McCLOUD.